United States Patent Office 3,636,048
Patented Jan. 18, 1972

3,636,048
CHLORONAPHTHO DITHIOLE COMPOUNDS AND
A METHOD FOR THEIR PREPARATION
Erwin Klingsberg, Mountainside, N.J., assignor to American Cyanamid Company, Stamford, Conn.
No Drawing. Continuation-in-part of application Ser. No. 701,120, Jan. 29, 1968. This application July 15, 1970, Ser. No. 55,287
Int. Cl. C07d 71/00; C07c 25/22
U.S. Cl. 260—327 C                    7 Claims

ABSTRACT OF THE DISCLOSURE

A new class of chloronaphtho dithiole compounds is provided which are particularly useful as yellow colorants in plastics and as intermediates for the preparation of dielectric materials. The compounds are represented by the following formula:

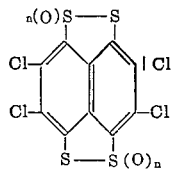

wherein $n$ is an integer from 0 to 2. Furthermore, a new yellow pigment is provided which consists essentially of 3,4,7,8 - tetrachloronaphtho[1,8 - cd:4,5c′d′]bis(1,2 - dithiole).

CROSS-REFERENCES TO RELATED APPLICATIONS

This application is a continuation-in-part application of United States application Ser. No. 701,120, filed Jan. 29, 1968, now abandoned.

Generally stated the subject matter of the present invention relates to heterocyclic carbon compounds where the hetero atom is sulfur. More particularly, the invention relates to chloronaphtho dithiole compounds and a method for their preparation.

BACKGROUND OF THE INVENTION

Derivatives of chloronaphthalenes and chloronaphthacenes are well known in the art, for example, U.S. Patent No. 2,905,695 discloses a mono peri derivative of octachloronaphthalene which is obtained by reaction with a polysulfide. In addition, Marschalk, Bull, Soc. Chim. 1948, 418, and 1952, 142, discloses reacting 5,11- and 5,12-dichloronaphthacenes and sulfur, using trichlorobenzene as a solvent, to get tetracene tetrasulfide. However, this reaction is not predictable, since 5,6,11-trichloro and 5,6,11,12-tetrachloronaphthacenes did not form tetracene tetrasulfide as would be expected from the dichloro reaction.

Accordingly, it is a primary object of the present invention to provide a new class of heterocyclic carbon compounds where the hetero atom is sulfur, the chloronaphtho dithioles.

Another object of the present invention is to provide a method for preparing the chloronaphtho dithioles.

Yet another object of the invention is to provide the new compound 3,4,7,8-tetrachloronaphtho[1,8-cd:4,5c′d′]bis(1,2-dithiole) which is particularly useful in its pigmentary form as a yellow pigment.

Additional objects and advantages of the invention will be set forth in part in the description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects, and in accordance with its purpose as embodied and broadly described, the present invention relates to the new and useful chloronaphtho dithiole bis-peri compounds represented by the formula:

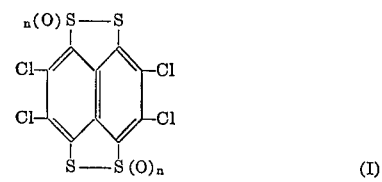

wherein $n$ is an integer from 0 to 2.

In its preferred embodiment the invention relates to the compound 3,4,7,8-tetrachloronaphtho [1,8-dc:4,5-c′d′]bis [1,2-dithiole] which is represented by the formula:

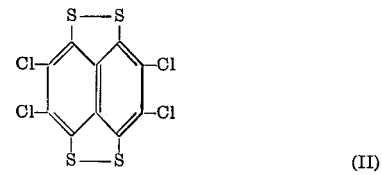

and is particularly useful in its pigmentary form as a yellow pigment. For convenience the compound (II) will be referred to more simply as tetrachloronaphtho-bis-dithiole.

In addition, the invention also relates to a process for preparing the chloronaphtho dithioles which comprises reacting octachloronaphthalene with sulfur, and depending on the degree of oxidation desired, either in the presence or absence of oxygen or an oxidizing agent.

It should be understood that the pictorial representation of the general formula, designated (I), is only representative of the compounds of the invention and it is intended that the invention as claimed includes structures wherein the oxygen atoms, when present, are positioned in the dithiole ring so as to form other than the symmetrical structures shown. Thus, while it is believed that the symmetrical form shown above as the general formula predominates, it is also reasonable to expect localization of oxygen near other sulfur atoms or even between the sulfur atoms. These compounds are useful as yellow colorants in plastics and as intermediates in the preparation of the known capacitor dielectric 2,3,6,7-tetrachloronaphthalene.

The compound tetrachloronaphtho-bis-dithiole, which is yellow in color, exhibits useful pigment properties and shows lightfastness characteristics which are at least equal to or somewhat better than a commercial pigment. This compound is prepared by reacting liquid octachloronaphthalene with elemental sulfur in the absence of oxygen until reaction is complete, generally about 10 to 30 minutes for laboratory quantities.

The oxidized form is prepared by first forming the non-oxidized form as described above and thereafter oxidizing it by refluxing with a strong oxidizing agent such as chromic acid in the presence of a solvent for the reactants, such as acetic acid.

The temperature effective for reaction is the temperature at which octachloronaphthalene is liquid, that is from about 200° to 400° C., preferably from about 300° to 320° C., at atmospheric pressure. An excess of either reactant may be employed, but it is preferred to employ an excess of sulfur. The reaction is normally carried out in an inert atmosphere such as nitrogen.

The order of addition of the reactants is not critical and the reaction may be conducted at sub- or super-atmospheric pressures with a concomitant change in reaction temperature. Likewise, duration of reaction and the method of separation and purification are not critical. An effective separation technique is to free the reactive mixture of excess sulfur by digestion with carbon disulfide followed by recrystallization from, for example, pyridine or o-dichlorobenzene.

In the preparation of pigments first a crude or non-pigmentary product is often obtained by the chemical reaction employed in the synthesis of a compound. This crude product is not in pigmentary form but must be conditioned by known means such as acid pasting or solvent milling in order to obtain a practical useful pigment. The pigment of the present invention is defined as having a surface area of at least about 15 square meters per gram and particle size of essentially 0.5 micron and less. This recitation of particle size should not be construed as being exclusive in nature, since the pigment may also contain material having a larger particle size. In essence, the pigment substantially consists of particles having a size of 0.5 micron and less.

The following examples are provided for illustrative purposes and may include particular features of the invention. However, the examples should not be construed as limiting the invention, many variations of which are possible without departing from the spirit or scope thereof.

EXAMPLE I

Preparation of tetrachloronaphtho-bis-dithiole (II)

A mixture of 4 g. octachloronaphthalene and 10 g. sulfur was fused in a stream of nitrogen at 310–320° C. for fifteen minutes. The product was cooled, crushed, and freed of unreacted sulfur by digestion with carbon disulfide. The yield was 3.3 g. of brown solid which was purified by crystallization from o-dichlorobenzene. It may also be crystallized from pyridine and it has a melting point of 356° C. (dec.) When the method above is conducted at 400–410° C., a similar result is obtained. The product is 3,4,7,8 - tetrachloronaphtho[1,8-cd:4,5-c′d′]bis(1,2-dithiole) and is in the form of needles ranging in length from 15 to 150 microns.

EXAMPLE II

Solvent shot milling procedure

In a 1-quart mill, 7 g. of the product (II) prepared as described in Example I is milled with 100 ml. of a 3 to 1 mixture of xylene and n-butanol using 600 g. of ⅛″ steel shot. The milling is continued for 24 hours at approximately 70 percent critical speed. The resulting slurry is then filtered and the product washed with a similar xylene-butanol 3 to 1 mixture to a slight yellow bleed. This product is then dried at 70° C. giving a material of a gold color with a melting point of 355° C. (dec.)

EXAMPLE III

Acid pasting procedure

A 5 g. portion of the product prepared using a procedure as described in Example I is stirred with 150 ml. of concentrated sulfuric acid for about a 45 minute period. After filtering the slurry the filtrate is added gradually to 100 ml. of ice slush, the slurry being maintained at about 0° C. The slurry is heated gradually to 85° C. over about a 60 minute period and is then maintained at 85° C. over about a 60 minute period and is then maintained at 85° C. for 45 minutes after filtration. The cake is washed with warm water followed by washing with a liter of water at the boiling temperature. The resulting gold colored solid is then dried at 70° C. The solid from the sulfuric acid filtration is also washed with 95% ethanol and dried at 70° C.

The product from the acid pasting drowning process had a melting point of 347° (dec.)

The undissolved material had a melting point of 348° C. (dec.)

EXAMPLE IV

Infrared examination of products

The products from the previous examples were subjected to infrared absorption measurements. In the following table are shown particle size measurements of products from the three previous examples, as well as a list of the wavelength peaks with an indication as to whether they are strong, medium, weak for comparison purposes.

Also shown are dominant wavelength values to describe the color of the pigment.

TABLE 1

| Product | Crude (Ex. 1) | Milled (Ex. II) | Acid pasted (Ex. III) |
|---|---|---|---|
| Particle size | 15–150 microns (needles) | 0.15–0.5 microns (median) | 0.06–0.07 microns (median) |
| Surface area | | 15.3 m, 2/g | 34.8 m, 2/g. |
| IR curve peaks | 6.48 w. / 6.63 s. / 7.1 s. / 7.78 s. / 8.4 w. / 10.16 m. / 11.72 m. / 11.92 w. | Same as for crude | 6.48 w. / 6.67 s. / 7.1 s. / 7.28 m. / 7.78 s. / 8.4 w. / 9.3 m. / 9.86 w. / 10.2 m. / 11.76 m. / 11.92 w. |

Note: Relative strengths indicated: w=weak; m=medium; s=strong.

TABLE 2

Color Characteristics

| | Crude (Ex. I) | Milled (Ex. II) | Acid pasted (Ex. III) |
|---|---|---|---|
| Percent purity | 17 | 33.5 | 38 |
| Dominant wavelength (in millimicrons) | 577.2 | 576.25 | 577.1 |

It is noted that there are three peaks which occur only in the acid pasted material, at 7.28; 9.3; and 9.86 microns. X-ray examination of the three products showed no differences between the products.

EXAMPLE V

Evaluation of lightfastness properties

Thermoset acrylic enamel formulations were prepared according to the procedures described below using a sample of the product from Example II and a sample of a commercial yellow pigment for comparison, identified as C.I. Vat Yellow 20, C.I. No. 68420. Formulations of the two materials were then exposed in Florida sunshine for 6 months (5° exposure) noting the color changes as a measure of lightfastness.

The procedures used are described in the following:

Preparation of pigment dispersion for TiO₂ tints and metallic aluminum finishes

A composite vehicle is first prepared by rolling the following in a wide mouth jar for several hours:

320 g. 50% solution of thermosetting methacrylate resin in xylene/butanol/2-methoxyethanol, ratio 60/22/18
40 g. butanol
360 g. xylene The using a 6 oz. jar, the following is rolled with 300 g. of ⅛″ steel shot for 20 hours:

4 g. of pigment to be tested
36. g. composite vehicle prepared above

Preparation of white base for tinting
(TiO₂ dispersion)

The following mixture is rolled in a 1 quart ball mill using berylite balls:

415 g. TiO₂
152. g. 50% solution of thermosetting methacrylate resin in xylene/butanol/2-methoxyethanol, ratio 60/22/18
45.3 g. butanol
26.1 g. xylene For reduction, the following is rolled in a 17 oz. jar:

133.4 g. of the TiO₂ dispersion prepared above
151.2 g. 50% solution of thermosetting methacrylate resin in xylene/butanol/2-methoxyethanol, ratio 60/22/18
39.0 g. 55% solution of isobutylated melamineformaldehyde resin in isobutanol
19.5 g. adipate polyester plasticizer, mol. wt. 5000
10.0 g. mineral spirits, B.P. 184–211° C.
59.4 g. xylene Preparation of tint enamel The following mixture is shaken in a bottle for 15 minutes on a paint shaker:

3 g. pigment dispersion base prepared above 26 g. white base tint prepared above This composition is then thinned for spraying with 50–50 xylene mineral spirits mixture and sprayed at 65 p.s.i. on a standard outdoor exposure panel. It is finally air dried, 15 minutes, and then baked for 30 minutes at 135° C.

Preparation of metallic finish
(40 pigment:60 Al)

An aluminum slurry is first prepared by mixing the following on a lightening stirrer:

92.5 g. aluminum flake, as non-leafing 65% paste
43.75 g. butanol
43.75 g. mineral spirits, B.P. 184–211° C.
20.0 g. xylene A clear composite is also prepared by rolling the following in a one quart wide mouth jar:

332.5 g. 50% solution of thermosetting methacrylate resin in xylene/butanol/2-methoxyethanol, ratio 60/22/18
76.0 g. 55% solution of isobutylated melamineformaldehyde resin in isobutanol
36.5 g. adipate polyester plasticizer, mol. wt. 5000
28.5 g. butanol
8.5 g. mineral spirits, B.P. 184–211° C.
21 g. xylene For reduction, (40:60) the following mixture is prepared:

31.2 g. clear composite from above
1.285 g. aluminum slurry from above
2.57 g. pigment dispersion base from above
1.61 g. 50–50 xylene-mineral spirits This enamel is then thinned with xylene for spraying and sprayed on a standard aluminum outdoor exposure panel. The sprayed panel is air-dried, 15 minutes, and baked at 135° C. for 30 minutes.

The sprayed panels are then exposed in Florida sunshine and observations made as to color change, fade, etc.

The evaluations were based on the scale of color change from 0 to 10 where 10 represents no change and 0 represents a total loss of color with conversion either to a complete black or complete white appearance. Color changes of 5 or above are found acceptable for use for pigments; changes from 6 to 10 normally are very slight.

The following table shows the results of the observations:

TABLE 3

| Product | 1–19 formulation | 40/60 Al formulation (metallized) |
|---|---|---|
| Example II | 6 darkens | 7 fades. |
| C.K. Vat Yellow 20 | 5+ fades | 6 fades. |

It may thus be seen that the product of Example II is at least equal to or better than the commercial pigment with respect to lightfastness.

EXAMPLE VI 3,4,7,8-tetrachloronaphtho[1,8-cd:4,5-c′d′]bis[1,2-dithiole]tetraoxide

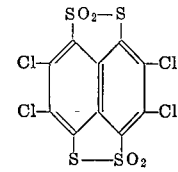

To 500 ml. acetic acid at reflux was added 9.75 g. of the product of Example I. To this solution 20 g. chromic acid was added in portions over a half hour. The reaction mixture was boiled under reflux for two hours, cooled to room temperature, filtered and washed with acetic acid. It was reslurried in acetic acid, filtered, washed with methanol and dried. The yield was 6.0 g. of product, melting point, 324–325.5° C.

EXAMPLE VII 2,3,6,7-tetrachloronaphthalene

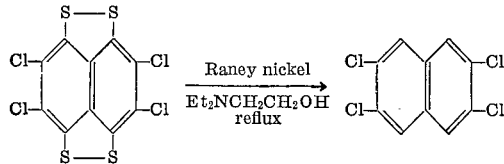

To an amber colored solution of 2.0 g. of the product of Example I in 75 ml. 2-diethylaminoethanol at reflux was added, with stirring over 15–20 minutes, 35 g. moist Raney nickel. The amber color disappeared. The solution was filtered, diluted hot with two volumes of water, cooled and filtered to give the product which, on crystallization from hexane, sintered at 184° C. and melted 200–205° C. Chlorine content was 52.38%. Structure was established by proton magnetic resonance spectroscopy to be 2,3,6,7-tetrachloronaphthalene.

When the product of Example II was used in the above procedure instead of the product of Example I, the same tetrachloronaphthalene was obtained, a useful capacitor impregnant for dielectrics.

EXAMPLE VIII

To a solid, powdered or granulated uniform mixture of 100 g. of rigid polyvinyl chloride was added 2 g. of a commercially available heat stabilizer and 0.25 g. of a commercially available ultraviolet light absorber. The mixture was milled on a 2-roll Thropp mill, one roll of which was steam-heated. When a workable molten mass was obtained, 1 gram of the compound of Example I was added and the mill run until all of the compound was in the plastic. The band was then cut at every pass for fifty or more passes until a uniformly yellow band was obtained. The mass was then compression-molded to give a 50 mil yellow plaque useful, for example, as a decorative element or receptacle, depending on the mold design.

What is claimed is:
1. A compound of the formula

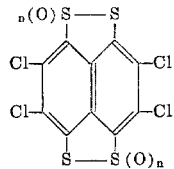

where n is 0 or 2.

2. The compound of claim 1 which is 3,4,7,8-tetrachloronaphtho[1,8-cd:4,5-c'd']bis(1,2-dithiole).

3. The compound of claim 2 in pigmentary particle size, having a surface area of at least about 15 square meters per gram and a particle size of essentially 0.5 micron and less.

4. The compound of claim 1 which is 3,4,7,8-tetrachloronaphtho[1,8 - cd:4,5 - c'd']bis[1,2-dithiole]tetraoxide.

5. A method of preparing the compound of claim 1 wherein $n$ is 0 comprising reacting octachloronaphthalene with sulfur in the absence of oxygen or an oxidizing agent.

6. A method of preparing the compound of claim 1 wherein $n$ is 2 comprising reacting 3,4,7,8-tetrachloronaphtho[1,8-cd:4,5-c'd']bis(1,2-dithiole) with chromic acid.

7. The method of claim 5 wherein the reaction is conducted in an acetic acid medium.

References Cited
UNITED STATES PATENTS 2,905,695   9/1959   Thelin _____ 260—327

HENRY R. JILES, Primary Examiner

C. M. SHURKO, Assistant Examiner

U.S. Cl. X.R.

106—48, 288 Q, 300; 260—92.8 R, 650 R